(12) United States Patent
Cox

(10) Patent No.: US 7,753,596 B2
(45) Date of Patent: Jul. 13, 2010

(54) FIBER OPTIC CLOSURE METHODS AND APPARATUS

(75) Inventor: Terry D. Cox, Keller, TX (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 11/285,130

(22) Filed: Nov. 22, 2005

(65) Prior Publication Data

US 2007/0116413 A1     May 24, 2007

(51) Int. Cl.
*G02B 6/38* (2006.01)
*G02B 6/36* (2006.01)
*G02B 6/00* (2006.01)

(52) U.S. Cl. ............................. 385/57; 385/59; 385/76; 385/135

(58) Field of Classification Search .................. 385/57, 385/135
See application file for complete search history.

(56) References Cited

U.S. PATENT DOCUMENTS

| | | | |
|---|---|---|---|
| 3,620,875 A | 11/1971 | Guglielman, Sr. et al. ... | 156/272 |
| 4,610,738 A | 9/1986 | Jervis ........................... | 156/49 |
| 4,665,279 A | 5/1987 | Ruschkofski et al. ..... | 174/40 R |
| 4,673,242 A | 6/1987 | Logan et al. ................ | 350/96.2 |
| 4,685,799 A | 8/1987 | Brininstool ................ | 356/73.1 |
| 4,701,010 A | 10/1987 | Roberts .................... | 350/96.15 |
| 4,736,071 A | 4/1988 | Hawkins et al. ................ | 174/92 |
| 4,859,809 A | 8/1989 | Jervis ........................... | 174/92 |
| 4,867,524 A | 9/1989 | Courtney et al. ........... | 350/96.2 |
| 5,029,958 A * | 7/1991 | Hodge et al. ................ | 385/100 |
| 5,308,954 A | 5/1994 | Manock et al. ............. | 219/243 |
| 5,825,963 A * | 10/1998 | Burgett ....................... | 385/135 |
| 5,892,870 A * | 4/1999 | Fingler et al. ................. | 385/59 |
| 5,937,121 A * | 8/1999 | Ott et al. ........................ | 385/59 |
| 6,167,183 A * | 12/2000 | Swain ........................ | 385/135 |
| 6,439,779 B1 * | 8/2002 | Hafer .......................... | 385/76 |
| 6,757,308 B1 * | 6/2004 | Eldring et al. ................ | 372/36 |
| 6,786,652 B2 | 9/2004 | Marquez et al. ............... | 385/92 |
| 6,795,182 B2 | 9/2004 | Rakuljic et al. ............. | 356/328 |
| 2001/0052451 A1 * | 12/2001 | Ruoss et al. ................. | 198/853 |
| 2003/0147597 A1 * | 8/2003 | Duran ......................... | 385/76 |

(Continued)

OTHER PUBLICATIONS

EMABOND Process, www.ashchem.com/ascc/specialty/emabond. asp, retrieved Oct. 27, 2005.*

(Continued)

*Primary Examiner*—Uyen-Chau N Le
*Assistant Examiner*—Chris H Chu
(74) *Attorney, Agent, or Firm*—John H. Vynalek

(57) ABSTRACT

A multiport includes a multiport housing top piece, and a multiport housing bottom piece welded to the housing top piece. Alternatively, a method for fabricating a multiport includes providing a multiport housing top piece, providing a multiport housing bottom piece, and welding the housing top piece to the housing bottom piece. Additionally, a method of fabricating a multiport housing piece includes providing a body, and welding a plurality of connector adapters to the body. Alternatively, an optical fiber connector closure includes a connector housing top piece, a connector housing bottom piece, and a strength seal positioned between the top piece and the bottom piece such that said connector closure has a burst test rating of about 5 to about 125 Pounds per Square Inch (PSI).

30 Claims, 5 Drawing Sheets

U.S. PATENT DOCUMENTS

2004/0161217 A1* 8/2004 Hodge et al. ............... 385/135
2004/0213620 A1* 10/2004 Bergeron et al. ............ 400/668
2005/0163448 A1 7/2005 Blackwell, Jr. et al. ...... 385/135
2006/0093303 A1* 5/2006 Reagan et al. ............... 385/135

OTHER PUBLICATIONS

Kagan, Val. A, "Recent Advances and Challenges in Induction Welding of Reinforced Nylon in Automotive Application," SAE International, 2004, www.ashchem.com/ascc/specialty/pdfs/SAE%20Paper%20Emabond%20Process.pdf.*

EMABOND™ Process, www.ashchem.com/ascc/specialty/emabond.asp, retrieved Oct. 27, 2005, 2 pages.

EMABOND™ Advantages, www.ashchem.com/ascc/specialty/emabond_advantages.asp, retrieved Oct. 27, 2005, 2 pages.

EMABOND® Formulated Resins For Thermopastics Assembly, 4 sheets.

* cited by examiner

FIBER OPTIC CLOSURE METHODS AND APPARATUS

BACKGROUND OF THE INVENTION

1. Field of the Invention

The present invention relates generally to telecommunication line equipment. More particularly, the invention relates to fiber optic closures and methods for fabricating multiports.

2. Technical Background

At least one known optical closure configuration includes a housing top piece and a housing bottom piece, with a sealing gasket there between. The pieces are held against one another, i.e., both pieces are biased toward the gasket with a mechanical fastener such as a screw fastener to provide seal compression. Another known configuration includes a gasket and at least one clip fastener providing a compression force against the gasket. It is desirable to reduce the time and costs associated with the known configurations for sealing and fastening.

SUMMARY OF THE INVENTION

In one aspect, the present invention is directed to an optical fiber connector closure that includes a connector housing top piece, and connector housing bottom piece, and a strength seal positioned between the top piece and the bottom piece such that the connector closure has a burst test rating of about 5 to about 125 Pounds per Square Inch (PSI). The strength seal can be, for example, a weld, and the connector closure can be an adapter closure.

In another aspect, the present invention is directed to a fiber optic connector closure including at least two connector housing pieces welded together.

In another aspect, the present invention is also directed to a method for fabricating a fiber optic connector closure. The method includes providing a fiber optic connector closure housing top piece, providing a fiber optic connector closure housing bottom piece, and welding the housing top piece to the housing bottom piece.

In still another aspect, the present invention is still further directed to a method of fabricating a fiber optic closure connector housing piece. The method includes providing a body and joining, as by welding or fusing, a plurality of connector adapters to the body.

Additional features and advantages of the invention are set out in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present exemplary embodiments of the invention, and are intended to provide an overview or framework for understanding the nature and character of the invention as it is claimed, and not for reasons of limitation. The accompanying drawings are included to provide a further understanding of the invention, and are incorporated into and constitute a part of this specification. The drawings illustrate various embodiments of the invention, and together with the detailed description, serve to explain the principles and operations thereof, and are not provided for reasons of limitation.

DETAILED DESCRIPTION OF THE INVENTION

Figure 1:
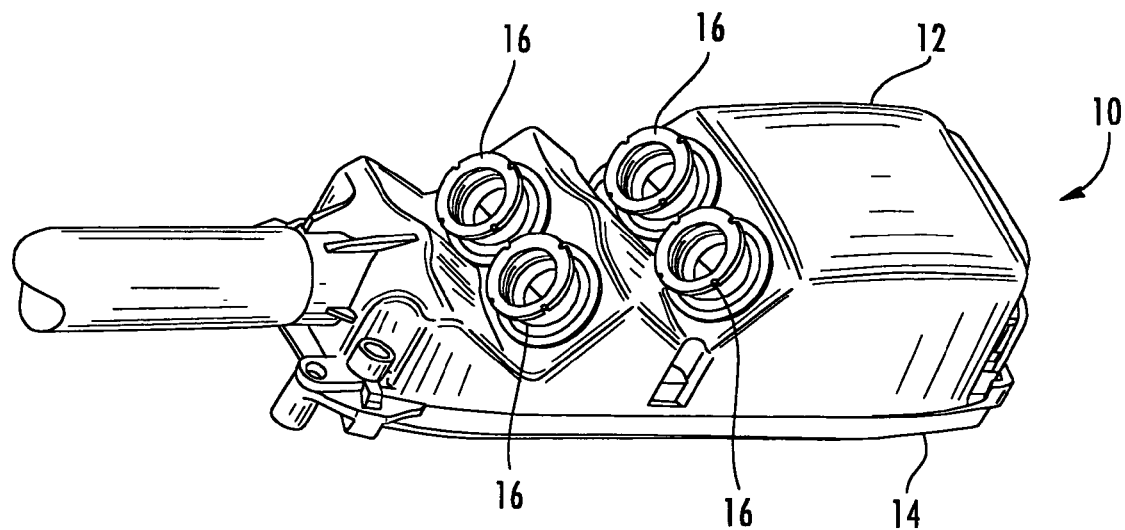
FIG. 1 illustrates an exemplary fiber optic connector closure according to one embodiment of the present invention.

Reference will now be made in detail to several exemplary embodiments of the invention, and examples of which are illustrated in the accompanying drawings. Whenever possible, the same reference numerals will be used throughout the drawings to refer to the same or like parts.

FIG. 1 illustrates a device 10 having a housing 12 and a housing 14 which are referred to by way of non-limiting examples as top and bottom pieces, respectively. The device 10 can be a multiport device or another fiber optic connector housing. The device may include housing or pieces attached to or in addition to housings 12 and 14. Although described and illustrated with reference to a top and lower relationship the benefits of the invention accrue to other housing geometries and therefore the term "housing top piece" refers to one part and the term "housing bottom piece" refers to another part, wherein the parts can be in any geometric relationship. For example, in one embodiment, the housing top piece is below the housing bottom piece, and, in another embodiment, the top and bottom pieces are side by side. Connector housing 10 includes at least one connector 16 (such as a port), and, more preferably, it has a plurality of ports 16 and the closure can take the form of a "multiport" fiber optic terminal or closure attached to at least one cable. Although the fiber optic connector closure of the present invention is illustrated having four ports, it is contemplated that the benefits of the invention accrue to connector closures with any numbers of ports, and the illustration of FIG. 1 is exemplary. Additionally, the terms "port" and "connector adapter" are used interchangeably herein and both refer to an optical fiber interconnection area including a mechanical device designed to align fiber-optic connectors. The connector and adaptor parts can be attached using a strength seal in accordance with the present invention. Additionally, as used herein the term "fiber optic connector closure" refers to fiber optic closures forming a shell and an interior space wherein at least one fiber optic connector is positioned within the interior space or on the shell itself. The connector can be any type of connector such as a plug, a receptacle, a jack, or preferably an adapter. As can be seen in the figures, multiport 10 is one example of a fiber optic connector closure.

The ports may be in any arrangement, such as two or more rows, side-by-side, or a single row, or in staggered rows and can be located on the tops, sides or edges of the housing piece(s). The ports may be on a flat surface or on an angled surface. Pieces 12 and 14 can be of the same material or of different materials. In one embodiment, at least two of the housing pieces are formed of polypropylene. In one embodiment, at least two of the housing pieces are formed of different materials. Suitable materials include plastic such as polypropylene and polyethylene, filled polymers (using talc, glass, or other material), rubber, ceramic, glass, and other materials.

One embodiment preferably includes at least one flexible section in multiport 10. In another embodiment, multiport 10 includes a plurality of flexibly attached sections. The different sections can be attached with a flexible material such as an elastomer or can use mechanical devices that allow flexibility such as hinges. Alternatively, the housings can be fabricated from a highly flexible material. Additionally, several multiports 10 can be installed in a series on a single cable line with the spacing of the cable lengths between the multiports 10 allowing for a flexible deployment and non-preterminated fibers can pass a particular multiport 10 and be terminated down the cable line either at an end of the cable or at another multiport 10 or other type of fiber optic connector housing.

Figure 2:
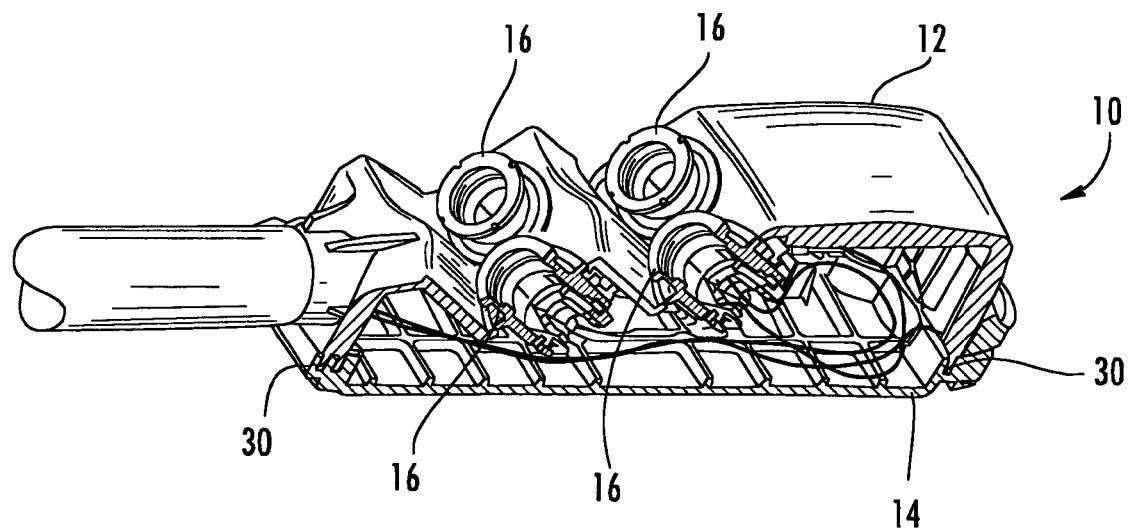
FIG. 2 illustrates a partial cross section of the fiber optic connector closure as shown in FIG. 1.
Figure 3:
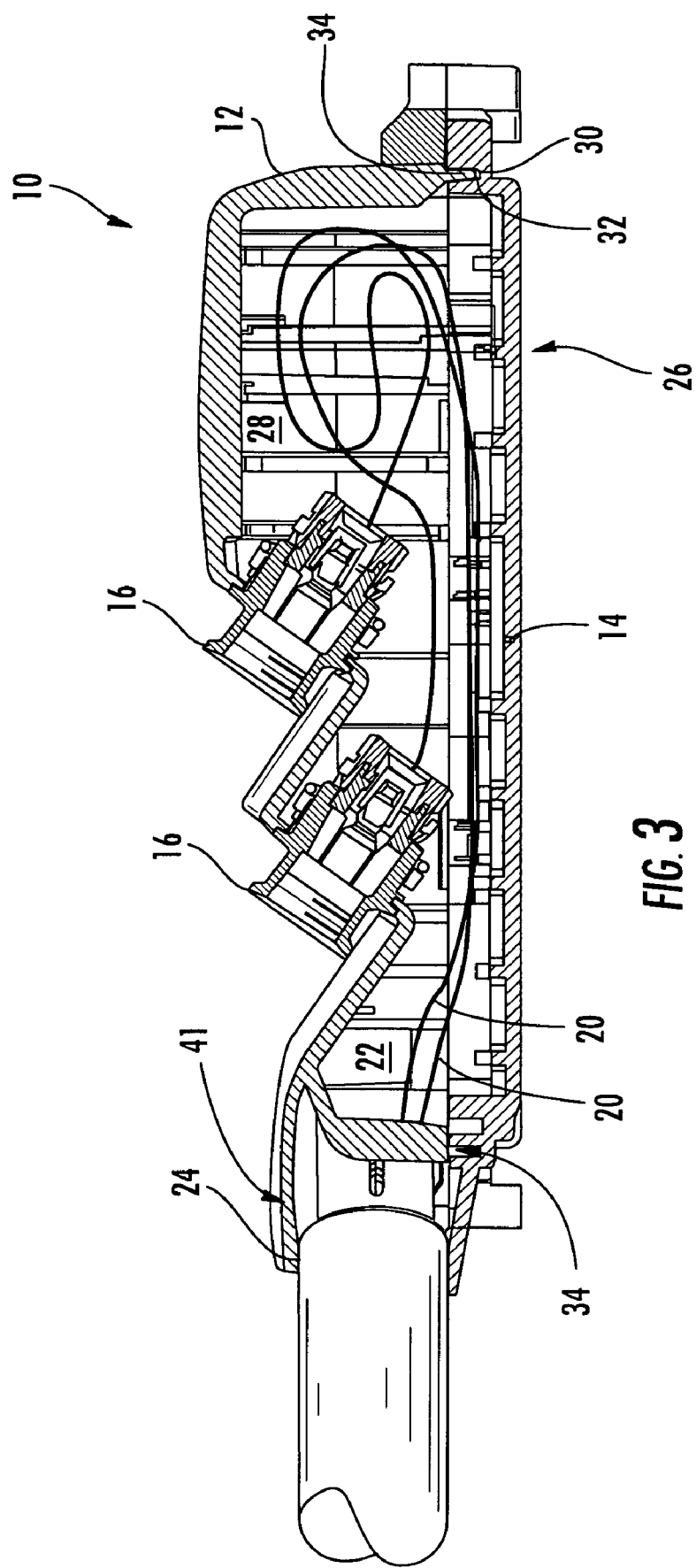
FIG. 3 illustrates a partial cross section of the fiber optic connector closure as shown in FIG. 1.

FIG. 2 is a perspective cut away view of multiport 10 depicting an exemplary embodiment of the invention where the cable ends at closure 10, and FIG. 3 is a side cut away view of multiport 10. Optical fiber 20 enters an interior space 22 of multiport 10 from a cable 24 and extends to at least one port 16. Multport 10 is preferably sized to define a slack storage space 26 in an open space 28. The slack storage space 26 can be at any location in the closure. The cable can enter into the housing pieces 12 or 14 in a butt configuration with a stub in one end and the drop cables facing the same end. Or it could be a through configuration with a stub in one end, and drop cables out the opposite end.

For example, in one embodiment, to seal housing top piece 12 and housing bottom piece 14 together, the strength seal can include a heat soluble resin. The heat soluble resin can be in the form of a thermoplastic cord containing magnetically active particles. The heat soluble resin is placed in groove 32, and the top and housing bottom pieces 12 and 14 are pressed toward each other. An induced energy then heats the heat soluble material (also referred to herein as a resin) causing the heat soluble material to soften and then re-harden upon a subsequent cooling thereby making a strong seal at the housing interface. Typically, the strength seal (e.g., the cord of thermoplastic) extends entirely around a circumference of the pieces to be welded together; however, in some applications the cord does not extend entirely around the circumference, but just along some of the circumference. The resin can include magnetically active particles and the induced energy can be an RF electromagnetic field which induces eddy currents in the magnetically active pieces. The eddy currents flowing in the magnetically active particles heat the magnetically active particles which cause the heat soluble material to soften and bond with top and housing bottom pieces 12 and 14. The RF field is then turned off, and when the heat soluble material cools off, the heat soluble material hardens, and thus, top and housing bottom pieces 12 and 14 are welded together. One exemplary embodiment employs EMABOND™ commercially available from the Ashland Specialty Chemical company of Ohio as the heat soluble material with embedded magnetically active particles.

In one embodiment, connector adapters 16 are molded into housing top piece 12, for example, adapters 16 can be co-injection molded with the rest of housing top piece 12. Alternatively, in another embodiment, connector adapters 16 are fabricated separately and a strength seal is positioned between adapters 16 and housing top piece 12. For example, and in one embodiment, connector adapters 16 are fabricated separately from housing top piece 12 and adapters 16 are then welded to housing top piece 12 using the same or similar welding process described above. The closure of the present invention preferably has a burst test rating of about 5 to about 125 Pounds per Square Inch (PSI), more preferably about 5 to about 25 PSI, and most preferably about 5 to about 15 PSI. Also, the closure should withstand multiple freeze-thaw cycles without significant performance issues. For example, connector closures 10 fabricated as described above are able to withstand temperature cycling of 120 cycles at −40C to +65C over a 30 day period. Additionally, closures 10 can pass freeze-thaw tests that involve 10 freeze thaw cycles over an 80 day period. After the freeze-thaw tests, multiports 10 have withstood a water immersion test where multiports 10 were placed under ten feet of water for seven days and experienced no leakage. At least one connector should be either within the enclosure or positioned in a wall of the closure. Preferably the connector is an adapter. As used herein, the term wall refers to any surface of a closure housing including a top or bottom surface as well as side surfaces. Additionally, it is contemplated that the benefits of the invention accrue to any shaped closure not just the shapes as illustrated. Suitable shapes include ones with square cross-sections, oval cross-sections, circular sections, as well as cross-sections with at least one line of symmetry and cross-sections with no lines of symmetry.

Multiport 10 can be a pre-terminated closure that allows drop cables to be deployed rapidly in an aerial, pedestal, or below grade settings. The stub end of the cable can be routed aerially, or underground through a duct, or direct buried and spliced into a pedestal, or any other type of closure or rack. Connector adapters are, in one embodiment, positioned on an outside surface of multiport 10 to allow a craftsperson to easily plug in a drop cable. This avoids the cost and time of entering a closure and splicing fibers. Multiport 10 can be pre-terminated at a factory. The connector adapters 16 are welded to housing top piece 12, the cable is pre-terminated and connectorized with the resulting pig tails being plugged into the inside side of adapters 16. Forming the strength seal at the interface of housing top piece 12 and housing bottom piece 14 provides a virtually non-re-enterable closure 10. The strength seal, preferably in the form of a weld, eliminates the need for gaskets and mechanical fasteners; however, closure 10 can include a gasket or mechanical fastener if desired. As used herein the term "strength seal" refers to welds, fused materials (e.g., the use of a glue, melted material, or other adhesive), while providing the herein described burst test performance.

Figure 4:
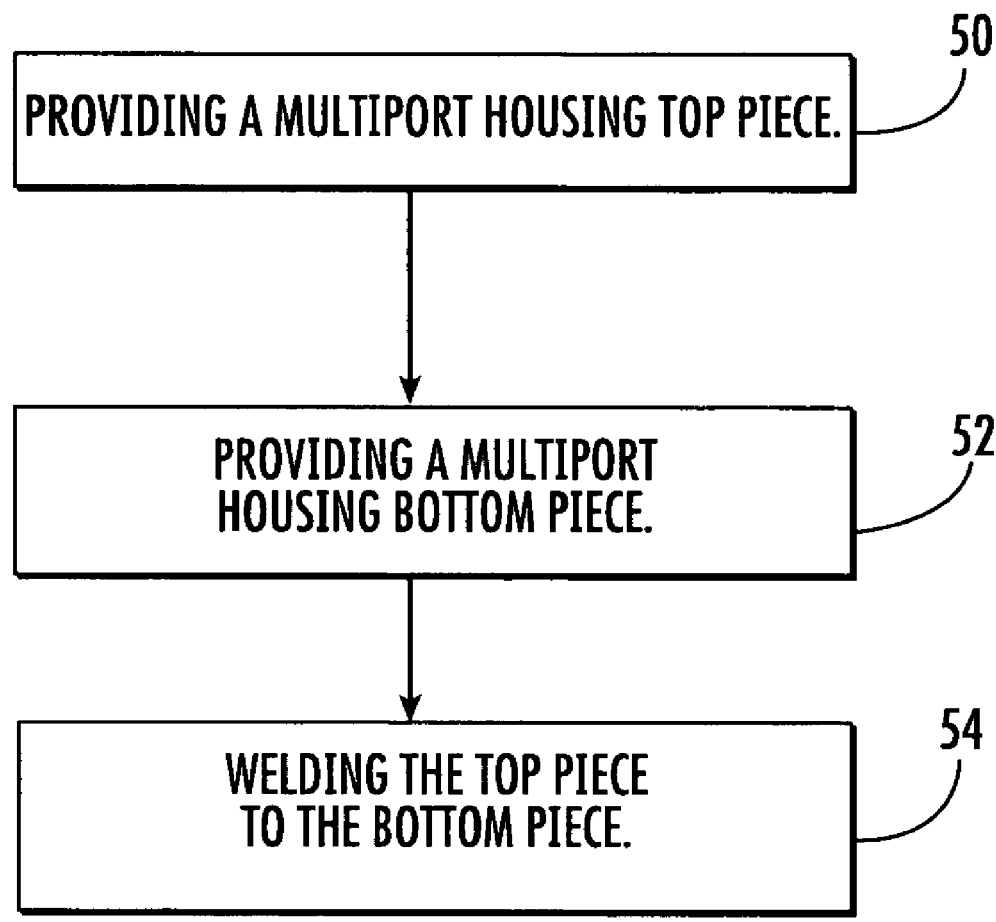
FIG. 4 illustrates an exemplary method for fabricating a fiber optic connector closure according to one embodiment of the present invention.

FIG. 4 illustrates a method 48 for fabricating a multiport 10. The method includes providing a multiport housing top piece 50, providing a multiport housing bottom piece 52, and forming a strength seal zone on at least a portion of the interface of the housing top piece 50 to the housing bottom piece 52.

Figure 5:
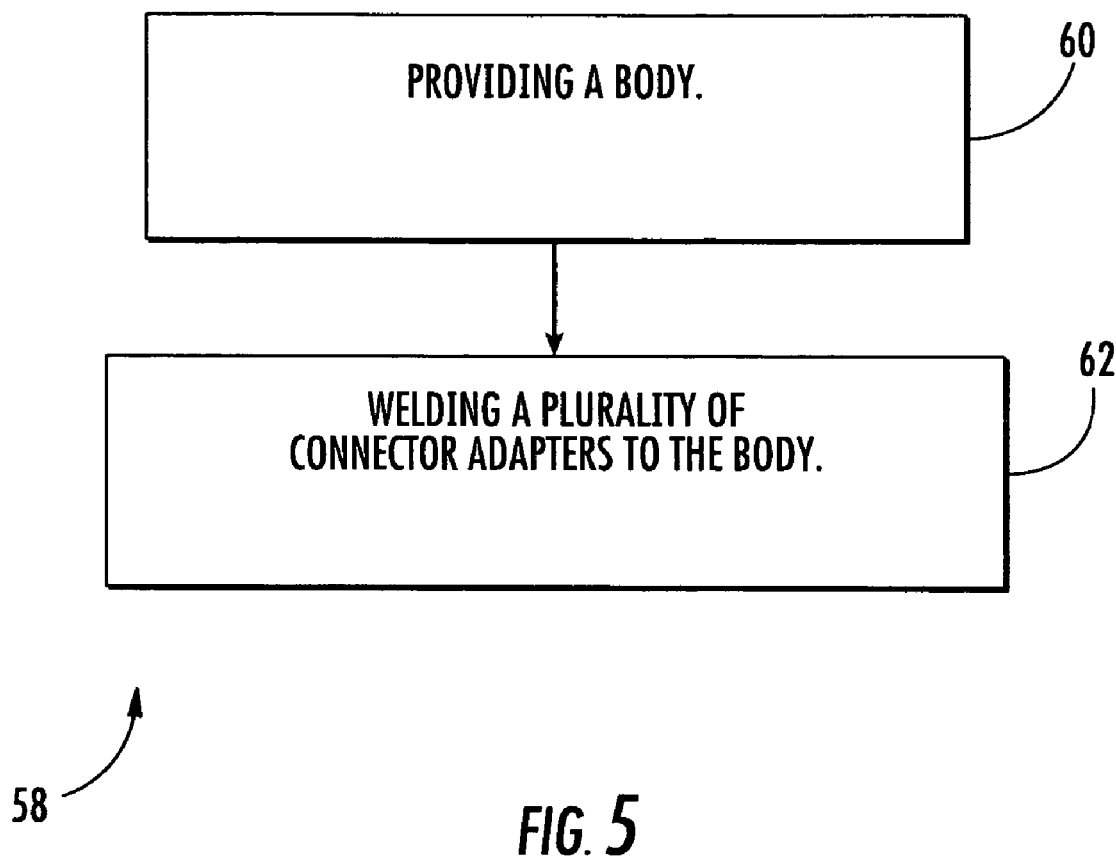
FIG. 5 illustrates an exemplary method of fabricating a fiber optic connector closure housing piece.

FIG. 5 illustrates a method 58 of fabricating a multiport housing piece. The piece could be the housing top piece or the housing bottom piece. The method includes providing a body 60 and forming a strength seal zone between a plurality of connector adapters and the body 62. In one embodiment the strength seal zone is a weld comprising a thermoplastic cord as described above. The body can be fabricated from any of the materials listed above.

Figure 7:
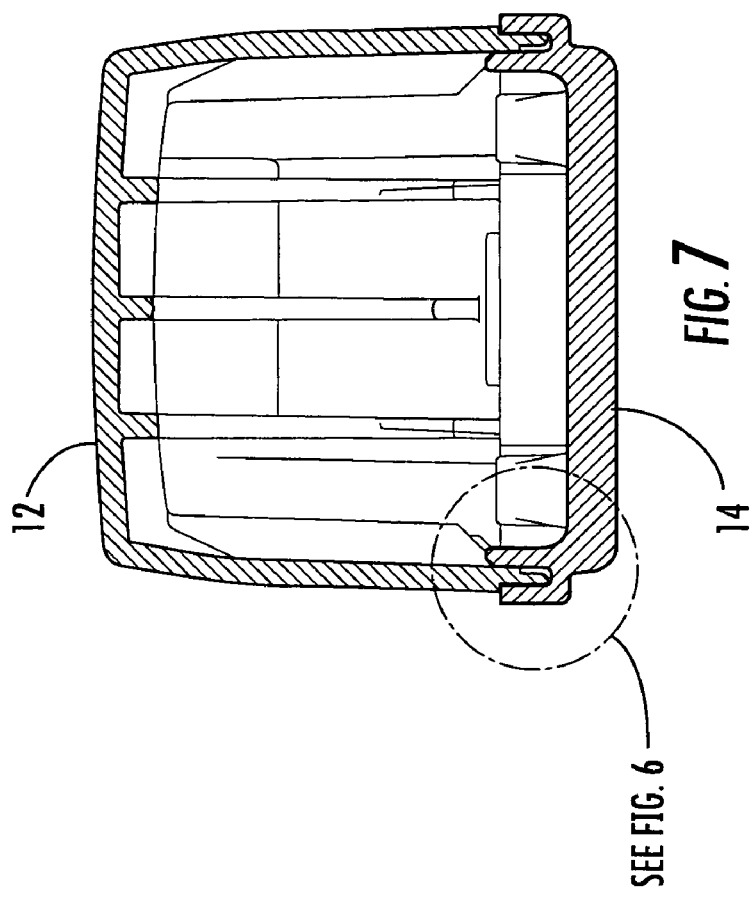
FIG. 7 also illustrates in detail that the housing pieces define a strength seal at an interface area.
Figure 6:
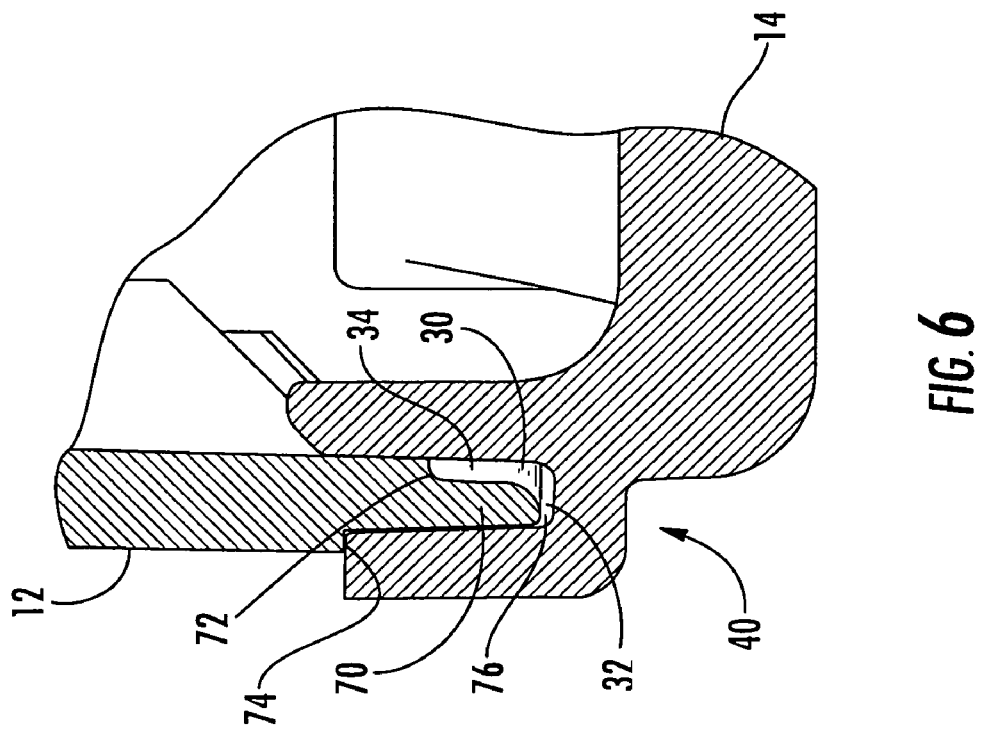
FIG. 6 illustrates in detail that the housing pieces define a strength seal at an interface area.

FIGS. 6 and 7 illustrate in detail that housing pieces 12 and 14 define a strength seal 40 at an interface area. Housing strength seal 40 includes a strength member 30 that mates with a seal area 32 on housing bottom piece 14. In one embodiment, a seal zone 34 welds or fuses housing top piece 12 and housing bottom piece 14 together. A tongue 70 extends at least partially into groove 32. In one embodiment, groove 32 defines a space wherein seal zone 34 occupies between 5 and 20 percent of the space so defined. At a top portion of tongue 70 is a rounded shoulder portion 72 that advantageously acts as a crack reduction member and reduces stress cracking of tongue 70. Portion 72 has a radius which is scaled to the tongue geometry. Additionally, tongue 70 includes a stop portion 74 that limits the insertion travel of tongue 70 into groove 32. Stop portion 74 is useful in that it maintains sufficient space for the thermoplastic cord to spread when heated and not to be pushed out of groove 32 while pressure is maintained of top housing 12 and bottom housing 14 against each other during the welding process.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents. For example, the flexible closure can include components used as couplers, splitters, filters, furcation tubes or other optical components. Additionally, a multi-fiber connector can be in the end wall for plugging in another distribution cable.

What is claimed is:

1. A fiber optic connector housing comprising:
   a connector housing top piece;
   a connector housing bottom piece, wherein the connector housing top piece and the connector housing bottom piece define an interior cavity, and wherein at least one optical fiber is contained within the interior cavity;
   a plurality of ports attached to at least one of the connector housing top piece and the connector housing bottom piece; and
   a strength seal placed between the connector housing top piece and the connector housing bottom piece, wherein at least one of the connector housing bottom piece and the connector housing top piece defines a groove and the other of the at least one of the connector housing bottom piece and the connector housing top piece defines a tongue adapted to extend at least partially within the groove, and wherein a top portion of the tongue has a rounded shoulder;
   wherein the strength seal is adapted to attach the connector housing top piece to the connector housing bottom piece.

2. A connector housing in accordance with claim 1 wherein the strength seal comprises a resin including magnetically active material.

3. A connector housing in accordance with claim 2 wherein said housing bottom piece is fabricated from a first material and said housing top piece is fabricated from a second material different from the first material.

4. A connector housing in accordance with claim 2 wherein said housing bottom piece is fabricated from a first material and said housing top piece is also fabricated from the first material.

5. A connector housing in accordance with claim 1 wherein the strength seal is positioned between the tongue and the groove and the strength seal comprises a resin including magnetically active material.

6. A connector housing in accordance with claim 1 wherein the plurality of ports are attached to at least one of the connector housing top piece and the connector housing bottom piece.

7. A connector housing in accordance with claim 6 wherein the plurality of ports are welded with a resin including magnetically active material.

8. A connector housing in accordance with claim 1 wherein the plurality of ports are fabricated from a first material and at least one of the connector housing top piece and the connector housing bottom piece is fabricated from a second material different from the first material.

9. A connector housing in accordance with claim 1 wherein the plurality of ports are fabricated from a first material and at least one of the connector housing top piece and the connector housing bottom piece is also fabricated from the first material.

10. A connector housing in accordance with claim 1, further comprising a stub cable received by at least one of the connector housing top piece and the connector housing bottom piece, and wherein the plurality of ports are angled relative to the stub cable.

11. The fiber optic connector housing of claim 1, wherein the plurality of ports are co-injection molded with the housing top piece.

12. The fiber optic connector housing of claim 1, wherein the interior cavity is substantially free of adhesive, epoxy and/or gel.

13. A method for fabricating a fiber optic connector housing, said method comprising:
   providing a connector housing top piece;
   providing a connector housing bottom piece, wherein the connector housing top piece and the connector housing bottom piece define an interior cavity;
   providing at least one optical fiber within the interior cavity having a slack storage space;
   attaching a plurality of ports to at least one of the connector housing top piece and the connector housing bottom piece; and
   welding the connector housing top piece to the connector housing bottom piece, wherein the connector housing top piece is welded to the connector housing bottom piece with a strength seal placed between the connector housing top piece and the connector housing bottom piece, and wherein at least one of the connector housing bottom piece and the connector housing top piece defines a groove and the other of the at least one of the connector housing bottom piece and the connector housing top piece defines a tongue adapted to extend at least partially within the groove, and wherein a top portion of the tongue has a rounded shoulder.

14. A method in accordance with claim 13 wherein welding the connector housing top piece to the connector housing bottom piece comprises:
   providing a strength seal comprising a resin including a magnetically active material;
   positioning the strength seal in contact with both the housing top piece and the housing bottom piece; and
   introducing a radio frequency electromagnetic field to the strength seal while substantially simultaneously applying pressure to the housing top and housing bottom pieces toward each other.

15. A method in accordance with claim 13 wherein the housing top piece and the housing bottom piece are the same material.

16. A method in accordance with claim 15 wherein the housing top piece and the housing bottom piece are made from different material.

17. A method in accordance with claim 13 wherein attaching the plurality of ports further comprises welding the plurality of ports to at least one of the connector housing top piece and the connector housing bottom piece.

18. A method in accordance with claim 13 wherein welding the connector housing top piece to the connector housing bottom piece comprises positioning the strength seal between the connector housing top piece and the connector housing bottom piece, and wherein the strength seal defines at least one of a glue and an adhesive.

19. An optical fiber connector closure comprising:
a connector housing top piece;
a connector housing bottom piece, wherein the connector housing top piece and the connector housing bottom piece define an interior cavity, and wherein at least one optical fiber is contained within the interior cavity;
a plurality of ports attached to at least one of the connector housing top piece and the connector housing bottom piece; and
a strength seal positioned between said top piece and said bottom piece such that said connector closure has a burst test rating of about 5 to about 125 Pounds per Square Inch (PSI);
wherein the strength seal attaches the connector housing top piece to the connector housing bottom piece, and wherein at least one of the connector housing bottom piece and the connector housing top piece defines a groove and the other of the at least one of the connector housing bottom piece and the connector housing top piece defines a tongue adapted to extend at least partially within the groove, and wherein a top portion of the tongue has a rounded shoulder.

20. A closure in accordance with claim 19 wherein said strength seal is such that said connector closure has a burst test rating of about 5 to about 25 PSI.

21. A closure in accordance with claim 19 wherein said strength seal is such that said connector closure has a burst test rating of about 5 to about 15 PSI.

22. A closure in accordance with claim 21 wherein the plurality of ports are welded to at least one of the connector housing top piece and the connector housing bottom piece with a resin including magnetically active material.

23. A closure in accordance with claim 21 wherein said strength seal comprises a weld of thermoplastic material with embedded magnetically active particles.

24. The fiber optic connector housing of claim 19, wherein the plurality of ports are co-injection molded with the housing top piece.

25. A fiber optic connector housing comprising:
a connector housing top piece;
a connector housing bottom piece, wherein the connector housing top piece and the connector housing bottom piece interface at an interface area and define an interior cavity, and wherein at least one optical fiber is contained within the interior cavity;
a plurality of ports attached to at least one of the connector housing top piece and the connector housing bottom piece; and
a strength seal placed between the connector housing top piece and the connector housing bottom piece on at least a portion of the interface area, and wherein at least one of the connector housing bottom piece and the connector housing top piece defines a groove and the other of the at least one of the connector housing bottom piece and the connector housing top piece defines a tongue adapted to extend at least partially within the groove, and wherein a top portion of the tongue has a rounded shoulder;
wherein the strength seal attaches the connector housing top piece to the connector housing bottom piece on at least a portion of the interface area.

26. A connector housing in accordance with claim 25 wherein the strength seal is positioned between the tongue and the groove and the strength seal comprises a resin including magnetically active material.

27. A method for fabricating a fiber optic connector housing, said method comprising:
providing a connector housing top piece;
providing a connector housing bottom piece, wherein the connector housing top piece and the connector housing bottom piece interface at an interface area to define an interior cavity;
providing at least one optical fiber within the interior cavity;
attaching a plurality of ports to at least one of the connector housing top piece and the connector housing bottom piece; and
welding the connector housing top piece to the connector housing bottom piece on at least a portion of the interface area, and wherein at least one of the connector housing bottom piece and the connector housing top piece defines a groove and the other of the at least one of the connector housing bottom piece and the connector housing top piece defines a tongue adapted to extend at least partially within the groove, and wherein a top portion of the tongue has a rounded shoulder.

28. The method in accordance with claim 27 wherein welding the connector housing top piece to the connector housing bottom piece uses a strength seal placed between the connector housing top piece and the connector housing bottom piece.

29. A method in accordance with claim 28 wherein the strength seal defines at least one of a glue and an adhesive.

30. The method in accordance with claim 27 wherein welding the connector housing top piece to the connector housing bottom piece comprises:
providing a strength seal comprising a resin including a magnetically active material;
positioning the strength seal in contact with both the housing top piece and the housing bottom piece on at least a portion of the interface area; and
introducing a radio frequency electromagnetic field to the strength seal while substantially simultaneously applying pressure to the housing top and housing bottom pieces toward each other.

* * * * *